US012035126B2

(12) United States Patent
da Costa Santos Fonseca et al.

(10) Patent No.: US 12,035,126 B2
(45) Date of Patent: Jul. 9, 2024

(54) SYSTEM AND METHOD FOR INTERPOLATING A HEAD-RELATED TRANSFER FUNCTION

(71) Applicant: Sound Particles S.A., Leiria (PT)

(72) Inventors: Nuno Miguel da Costa Santos Fonseca, Leiria (PT); Gustavo Miguel Jorge dos Reis, Leiria (PT); Ashley Ines Gomes Prazeres, Leiria (PT)

(73) Assignee: SOUND PARTICLES S.A. (PT)

( * ) Notice: Subject to any disclaimer, the term of this patent is extended or adjusted under 35 U.S.C. 154(b) by 24 days.

(21) Appl. No.: 17/474,734

(22) Filed: Sep. 14, 2021

(65) Prior Publication Data

US 2023/0081104 A1 Mar. 16, 2023

(51) Int. Cl.
*H04S 7/00* (2006.01)
*H04R 5/04* (2006.01)
*H04S 3/00* (2006.01)
*H04S 5/00* (2006.01)

(52) U.S. Cl.
CPC ............... *H04S 7/304* (2013.01); *H04R 5/04* (2013.01); *H04S 3/008* (2013.01); *H04S 5/005* (2013.01); *H04S 7/303* (2013.01); *H04S 2420/01* (2013.01); *H04S 2420/11* (2013.01)

(58) Field of Classification Search
CPC .......... H04S 1/002; H04S 5/005; H04S 7/303; H04S 2420/01; H04S 2420/11; H04S 7/304; H04S 3/008; H04R 5/04
See application file for complete search history.

(56) References Cited

U.S. PATENT DOCUMENTS

| | | | | |
|---|---|---|---|---|
| 10,327,089 B2 | 6/2019 | Foss et al. | | |
| 10,425,762 B1 * | 9/2019 | Schissler | H04S 7/303 | |
| 2009/0041254 A1 | 2/2009 | Jin et al. | | |
| 2009/0046864 A1 | 2/2009 | Mahabub et al. | | |
| 2010/0080396 A1 * | 4/2010 | Aoyagi | H04S 1/005 | 381/17 |
| 2011/0264456 A1 * | 10/2011 | Koppens | H04S 1/005 | 704/500 |
| 2013/0202124 A1 * | 8/2013 | Bellanova | H04R 25/70 | 381/60 |

(Continued)

FOREIGN PATENT DOCUMENTS

| | | | |
|---|---|---|---|
| CN | 101511047 A * | 8/2009 | |
| WO | 2013142653 | 9/2013 | |
| WO | WO-2017135063 A1 * | 8/2017 | F16B 17/008 |

OTHER PUBLICATIONS

Int'l Search Report and Written Opinion Appln No. PCT/US2022/058629 mailed Dec. 5, 2022.

(Continued)

*Primary Examiner* — Carolyn R Edwards
*Assistant Examiner* — Kuassi A Ganmavo
(74) *Attorney, Agent, or Firm* — McAndrews, Held & Malloy, Ltd.

(57) ABSTRACT

This disclosure describes a system and method for Head-Related Transfer Function (HRTF) interpolation when an HRTF dataset does not contain a particular direction associated with a desired source. The disclosed HRTF interpolation uses a finite set of HRTFs from a dataset to obtain the HRTF of any possible direction and distance, even if the direction/distance doesn't exist on the current dataset.

16 Claims, 7 Drawing Sheets

(56) References Cited

U.S. PATENT DOCUMENTS

| | | | | |
|---|---|---|---|---|
| 2015/0092965 | A1* | 4/2015 | Umminger | H04S 7/304 381/310 |
| 2016/0044430 | A1* | 2/2016 | Mcgrath | H04S 3/002 381/1 |
| 2016/0227338 | A1* | 8/2016 | Oh | H04S 7/303 |
| 2016/0373877 | A1 | 12/2016 | Laitinen | |
| 2018/0048979 | A1* | 2/2018 | Lee | H04S 7/303 |
| 2018/0192226 | A1* | 7/2018 | Woelfl | H04R 5/033 |
| 2018/0302737 | A1 | 10/2018 | Laitinen | |
| 2019/0313200 | A1 | 10/2019 | Stein | |
| 2020/0037091 | A1* | 1/2020 | Jeon | H04S 7/306 |

OTHER PUBLICATIONS

Int'l Preliminary Report on Patentability Appln No. PCT/IB2022/058629 dated Mar. 28, 2024.

* cited by examiner

SYSTEM AND METHOD FOR INTERPOLATING A HEAD-RELATED TRANSFER FUNCTION

BACKGROUND

Limitations and disadvantages of conventional approaches to interpolate a head-related transfer function (HRTF) will become apparent to one of skill in the art, through comparison of such approaches with some aspects of the present method and system set forth in the remainder of this disclosure with reference to the drawings.

BRIEF SUMMARY

A system and method for interpolating a head-related transfer function is provided substantially as illustrated by and/or described in connection with at least one of the figures, as set forth more completely in the claims.

DETAILED DESCRIPTION

The perception of 3D sound can be obtained with headphones, thru the use of Head-Related Transfer Functions (HRTFs). An HRTF comprises a pair of filters (one for the left ear, another for the right ear) that when applied to a particular sound, give you the sense of a sound coming from a particular direction. To implement such systems, an HRTF dataset may be used. An HRTF dataset comprises a plurality of filter pairs, where each filter pair may correspond to a different direction.

This disclosure describes a system and method for HRTF interpolation when an HRTF dataset does not contain a particular direction. The disclosed HRTF interpolation uses a finite set of HRTFs from a dataset, to obtain the HRTF of any possible direction and distance, even if the direction/distance doesn't exist on the current dataset.

The method for HRTF interpolation may be performed in spherical coordinates on the angle/direction (e.g., azimuth and elevation) of the sound source and the distance of the sound source.

Figure 1:
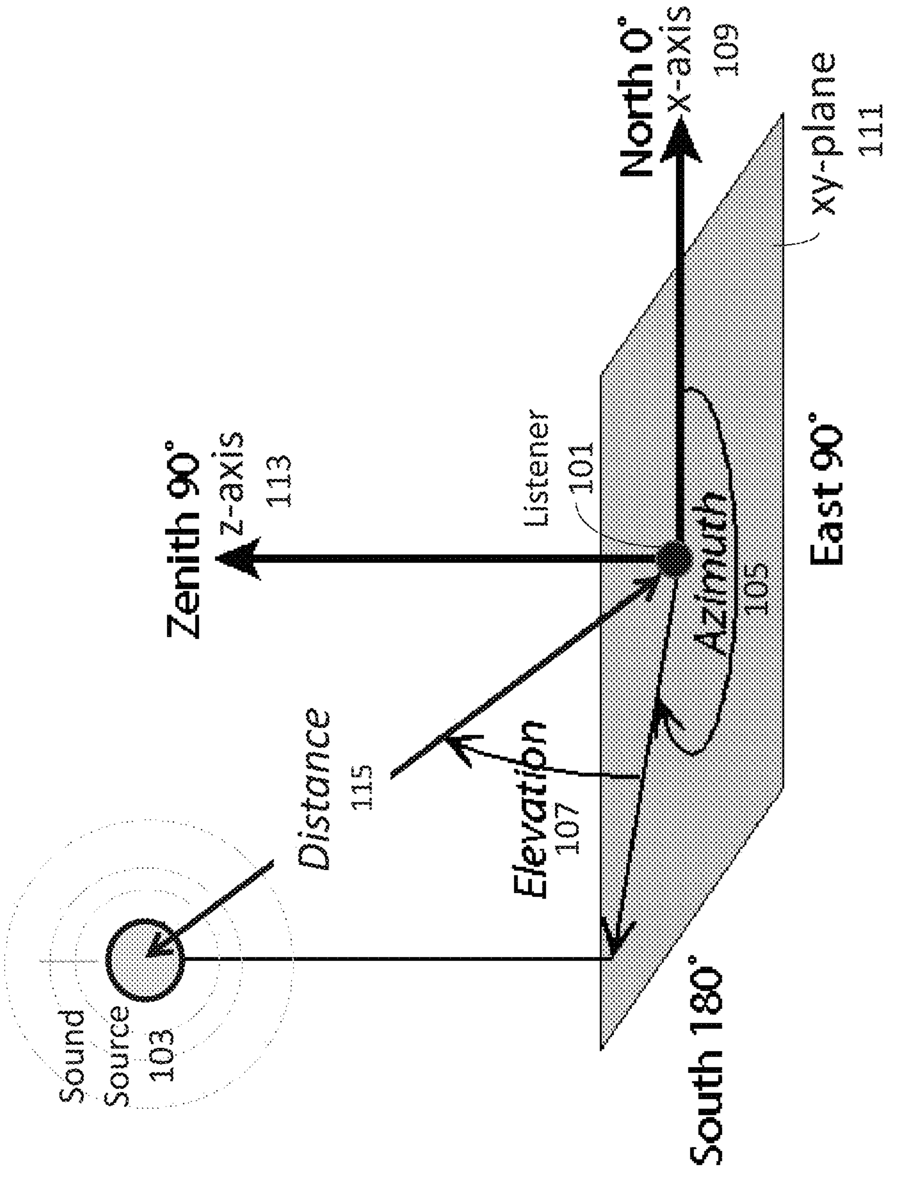
FIG. 1 illustrates an exemplary sound source positioned relative to a listener in accordance with aspects of this disclosure.

FIG. 1 illustrates an exemplary sound source 103 positioned relative to a listener 101. The azimuth 105 of the sound source 103 is determined in a clockwise direction from the x-axis 109. The elevation 107 of the sound source 103 is determined relative to the xy-plane 111 in the direction of the positive z-axis 113.

Figure 2:
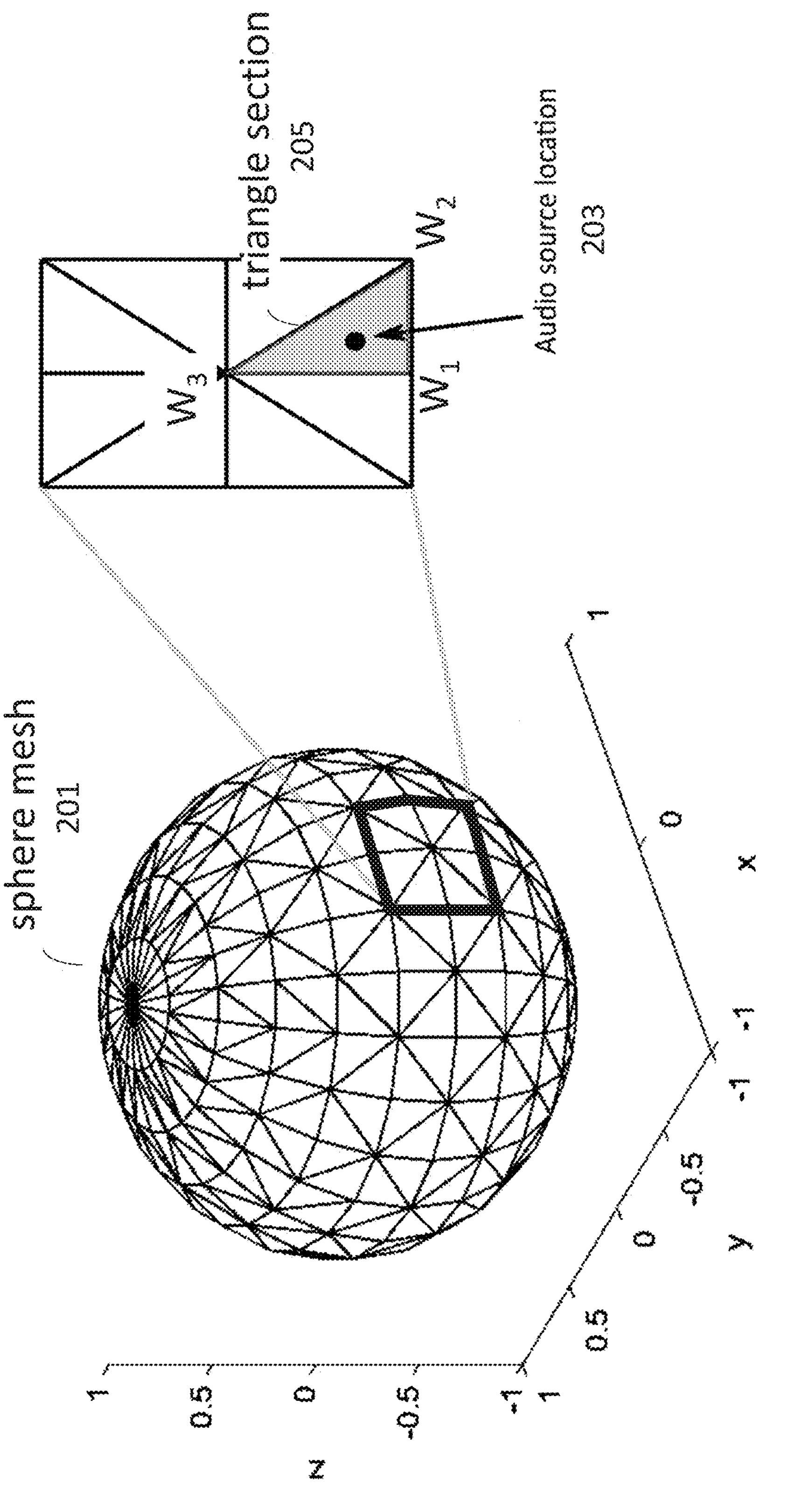
FIG. 2 illustrates an exemplary sphere mesh of an HRTF dataset in accordance with aspects of this disclosure.

An HRTF dataset of Head-Related Impulse Responses (HRIRs) may be generated for different azimuths and elevations. FIG. 2 illustrates an exemplary sphere mesh 201 of an HRTF dataset, where each of the vertices corresponds to a pair of HRIR. The HRTF dataset in FIG. 2 comprises a pair of HRIR for each azimuth step of 15 degrees (i.e., 24 lines of longitude) and each elevation step of 15 degrees (i.e., 25 latitudes). Other step sizes or mesh structures, including HRTF datasets with multiple distances, are also envisioned by this disclosure.

The sphere mesh 201 is generated (for instance, using a convex-hull method), using the azimuths and the elevations recorded in the dataset. This sphere mesh 201 comprises triangles (e.g., triangle section 205). Each vertex in each triangle corresponds to a position (azimuth and elevation) in the original HRTF dataset. For simulating a sound being emitted by an audio source from an audio source location 203, the triangle section 205 pertaining to that audio source position is identified.

While this disclosure is illustrated with single point sources that intercept the triangle at a single point, larger sound sources (that overlap multiple triangles) may also be used. While this disclosure is illustrated with a sphere mesh comprising triangles, other sphere meshes (comprising, for example, quadrilaterals) may also be used.

A weight ($W_1$, $W_2$, and $W_3$) of each triangle vertex is generated to triangulate the audio source location 203 within that triangle 205. These weights can be obtained using Vector-Base Amplitude Panning, or similar methods.

Figure 3:
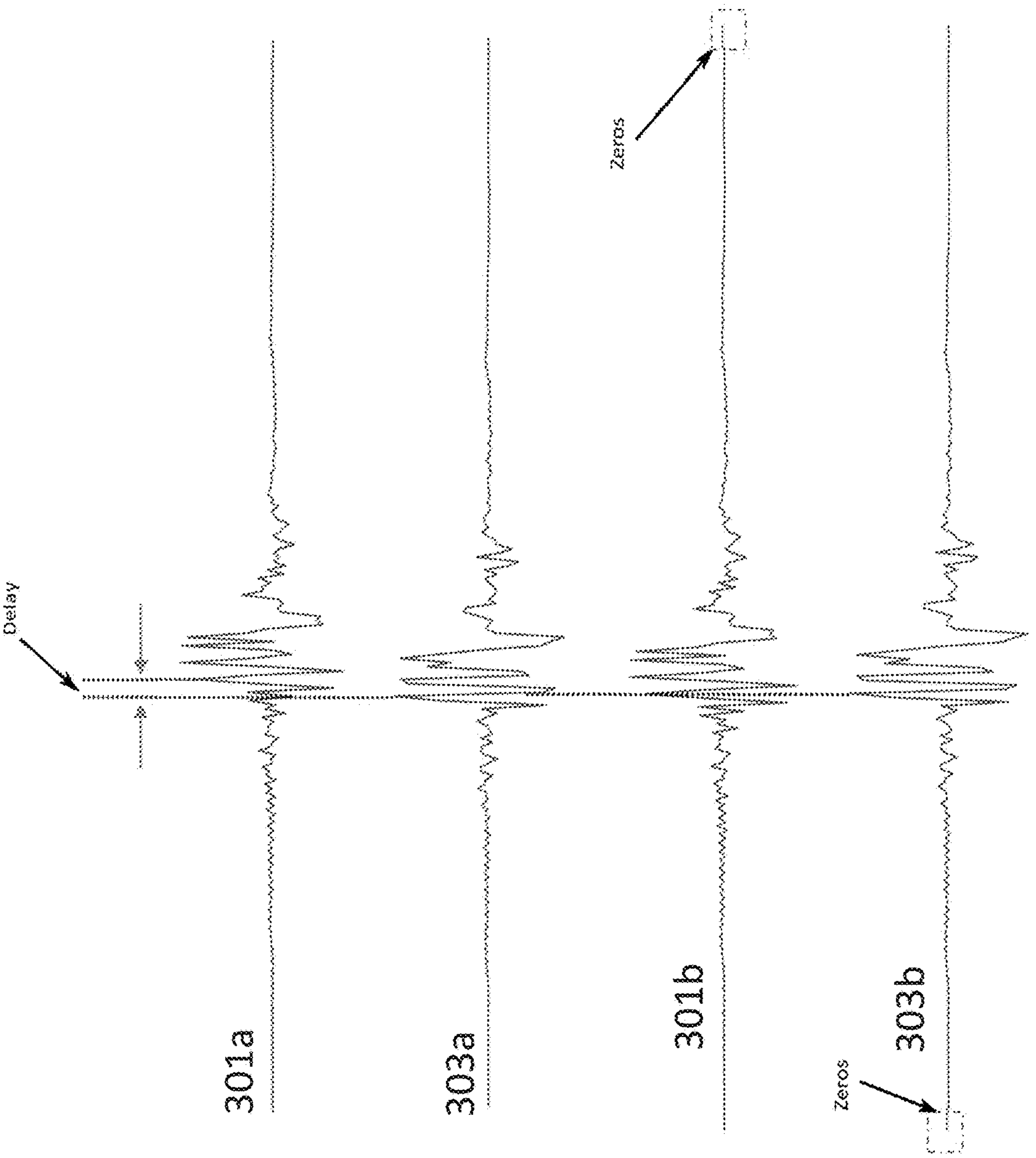
FIG. 3 illustrates an exemplary alignment in time domain of impulse responses in accordance with aspects of this disclosure.

Each HRIR in the dataset may have a different initial delay (i.e., they may not be aligned to each other in the time domain). The proposed method implements an initial alignment in the time domain. FIG. 3 illustrates an exemplary alignment in time domain of two HRIRs 301*a* and 303*a*.

Before alignment, the HRIRs 301*a* and 303*a* are converted to a higher sample rate (e.g. ×1,000 times more resolution using a resampling algorithm). The time deviation (shift) between each HRIR 301*a* and 303*a* is determined by correlation. The HRIRs 301*a* and 303*a* may be aligned by padding zeros at the beginning or at the end, as necessary, or eventually by removing samples. For example, in FIG. 2, HRIR 301*a* arrives after HRIR 303*a*. The delay of HRIR 301*a* is added to the beginning of HRIR 303*a* to generate time-shifted HRIR 303*b*. To maintain the same length as time-shifted HRIR 303*b*, zeros are appended to the end of HRIR 301*a* to generate HRIR 301*b*.

The time alignment can either be done within each triangle (aligning the 3 vertices of a triangle), but it can also be done globally (alignment of all vertices between them).

The weights ($W_1$, $W_2$, and $W_3$) are applied to the HRIRs of each vertex to compute the interpolated HRIR at the desired audio source location 203.

The weights ($W_1$, $W_2$, and $W_3$) are also used to affect the time shift of the obtained HRIR. As such, the final time shift will be given by the weighted average of the time shifts computed during the alignment process.

After alignment, the obtained HRIR is converted back to the original sample rate (e.g. using a resampling algorithm).

To interpolate distance from a sound source, a different azimuth (az) and/or elevation (el) is selected for each ear.

Figure 4:
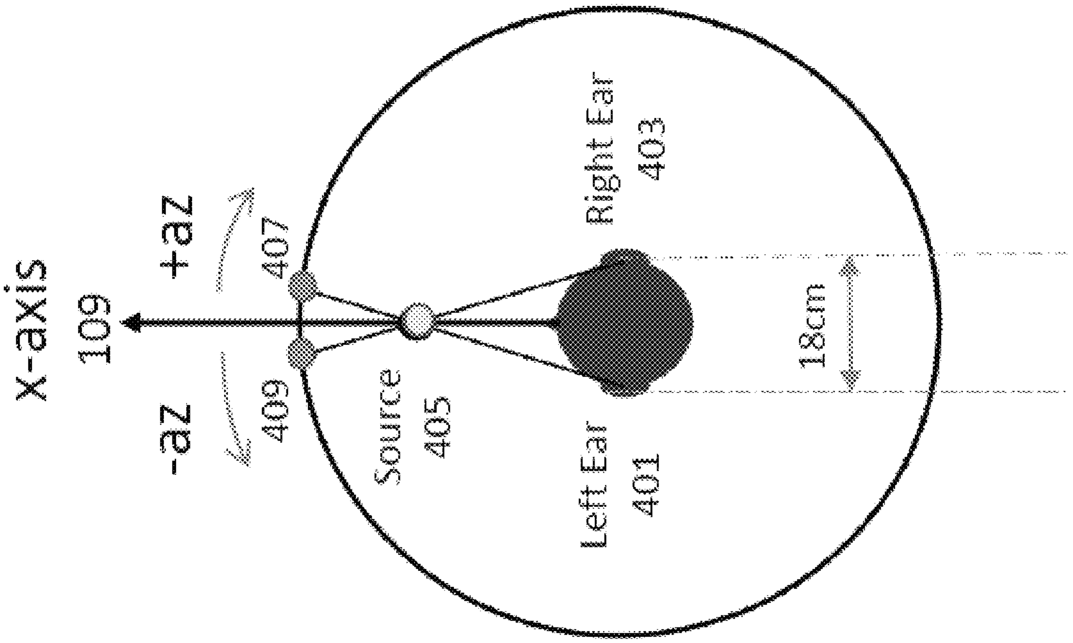
FIG. 4 illustrates an exemplary sound source positioned in front of a listener and at a distance shorter than the original distance of the HRTF dataset in accordance with aspects of this disclosure.

FIG. 4 illustrates an example sound source 405 located in front of a listener and at a distance shorter than the distance of the HRTF dataset. Relative to the center of the head, the sound source is located at az=0°, nonetheless, regarding the left ear 401, the sound comes from the same direction as position 407, and regarding the right ear 403, the sound comes from the same direction as position 409. The proposed method uses these separated directions for each ear, instead of using a common direction as regular approaches.

For processing, an example head width of 18 cm (9 cm to each side of the center) may be considered. Although any head size may be substituted.

Figure 5:
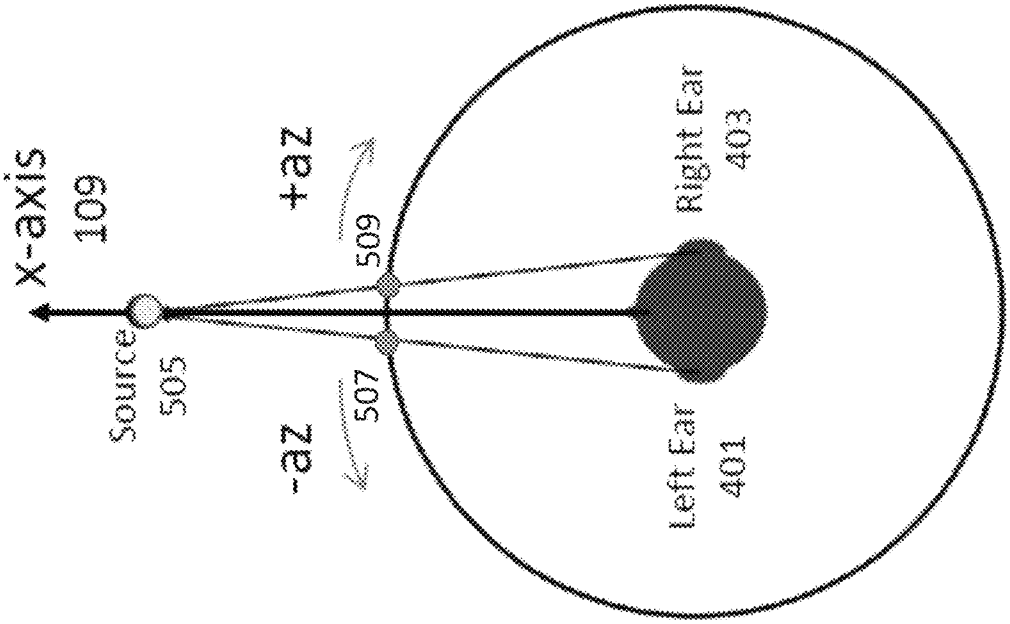
FIG. 5 illustrates an exemplary sound source positioned in front of a listener and outside the original distance of the HRTF dataset in accordance with aspects of this disclosure.

FIG. 5 illustrates an example sound source 505 located in front of and outside the HRTF distance. Relative to the center of the head, the sound source is located at az=0°, nonetheless, regarding the left ear 401, the sound comes from the same direction as position 507, and regarding the right ear 403, the sound comes from the same direction as position 509. The proposed method uses these separated directions for each ear, instead of using a common direction as regular approaches.

Figure 6B:
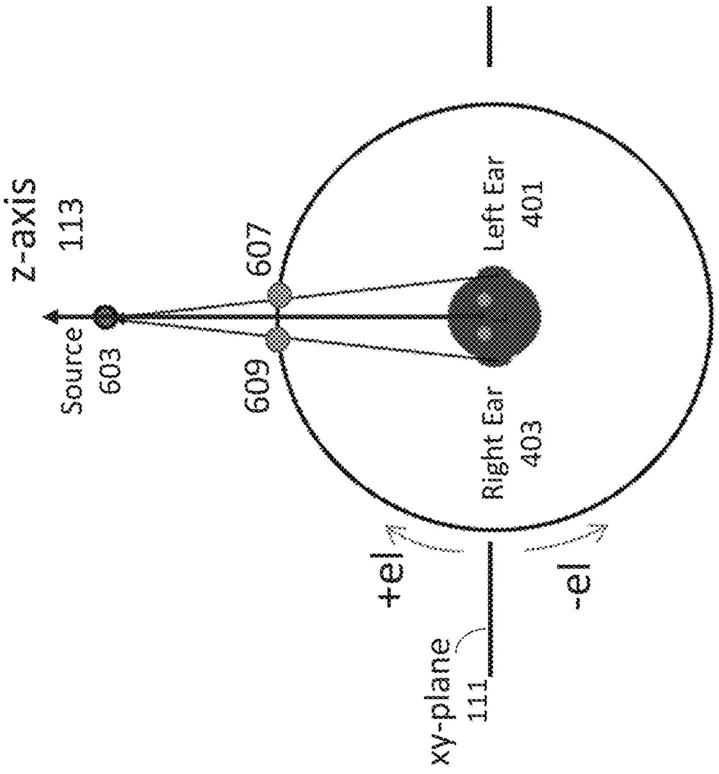
FIG. 6B illustrates an exemplary sound source located above a listener and at a distance outside the original distance of the HRTF dataset in accordance with aspects of this disclosure.
Figure 6A:
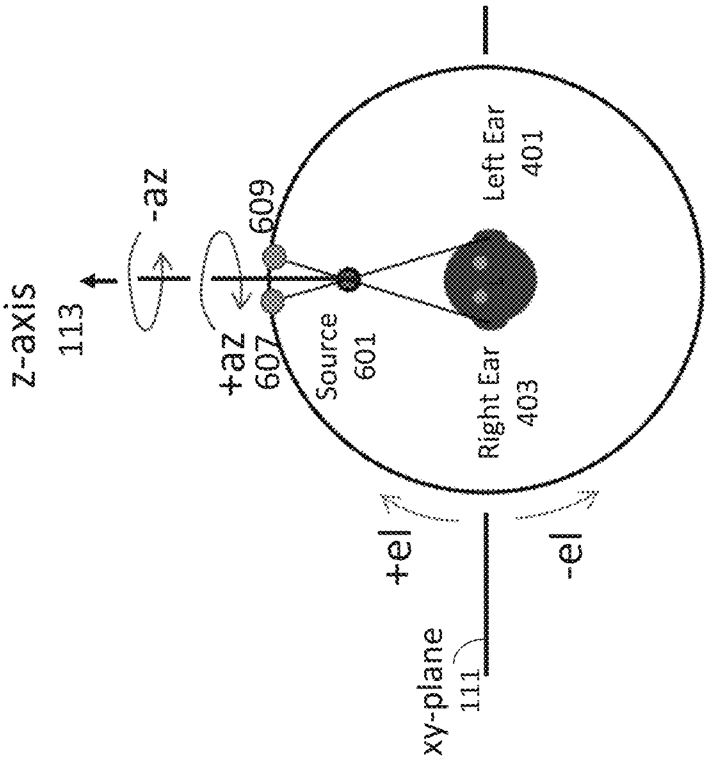
FIG. 6A illustrates an exemplary sound source located above a listener and at a distance shorter than original distance of the HRTF dataset in accordance with aspects of this disclosure.

FIG. 6A illustrates an example sound source 601 located above a listener and at a distance shorter than the HRTF distance. The sound source is located on the z-axis 113 (el=90°). From the left ear 401 point-of-view and the right ear 403 point-of-view, each elevation is the same and is less than 90°. The virtual position 607 will be used for left ear 401, and the virtual position 609 will be used for the right ear 403.

FIG. 6B illustrates an example sound source 603 located above a listener and at a distance outside the HRTF distance. The sound source is located on the z-axis 113 (el=90°). From the left ear 401 point-of-view and the right ear 403 point-of-view, each elevation is the same and is less than 90°. The virtual position 607 will be used for left ear 401, and the virtual position 609 will be used for the right ear 403.

Figure 7:
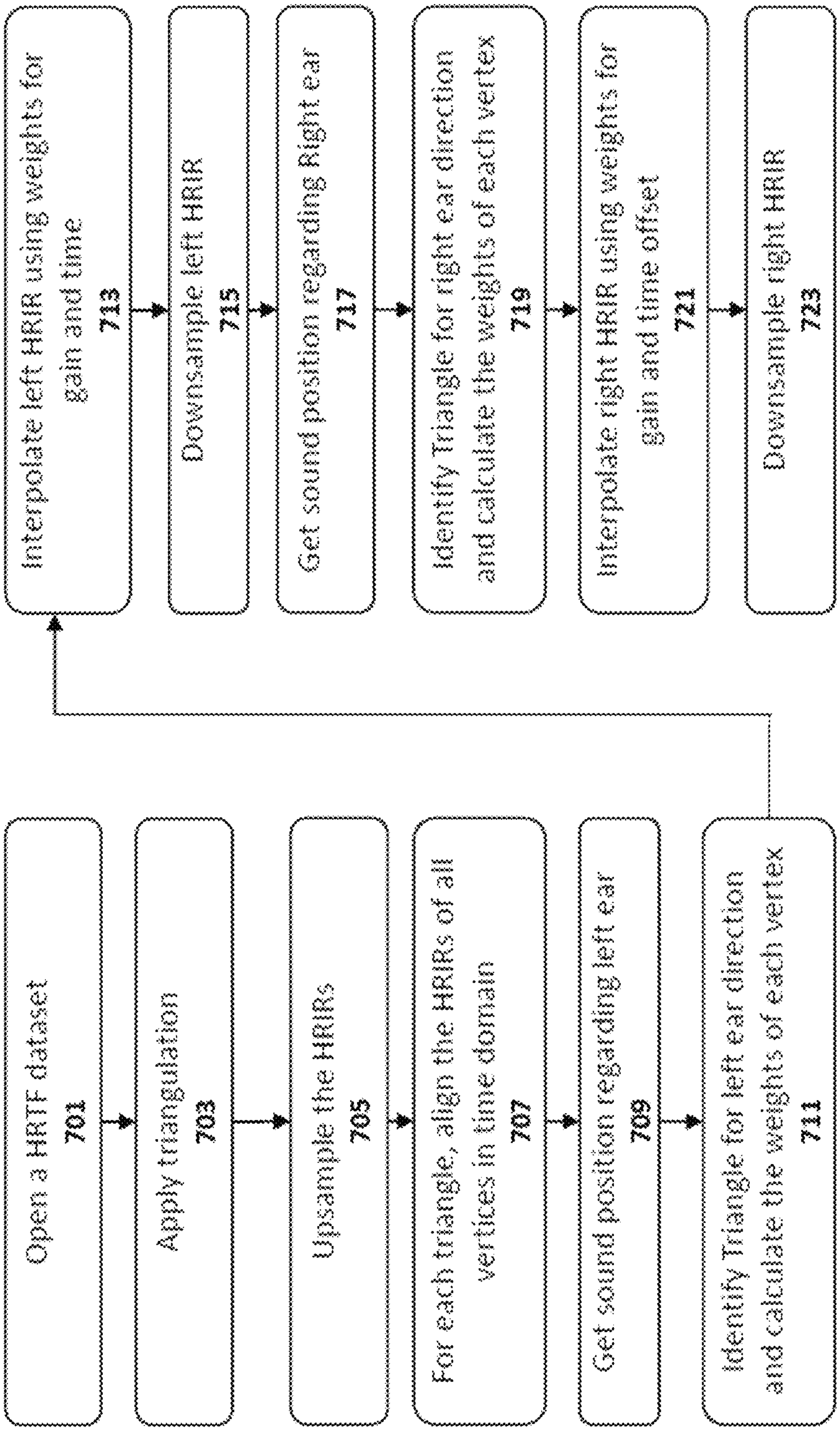
FIG. 7 is a flowchart that illustrates exemplary method of generating an HRTF in accordance with aspects of this disclosure.

FIG. 7 is a flowchart that illustrates exemplary method of interpolating an HRTF in accordance with aspects of this disclosure. At 701, an HRTF dataset is opened and loaded into the system. For example, each vertex of each triangle section lies on the HRTF sphere.

At 703, a triangulation is performed over an HRTF sphere.

At 705, each HRIR is upsampled to obtain a higher quality.

At 707, for each triangle, the HRIR of all vertices are aligned in the time domain.

At 709, the system gets the position of the sound source in relation to the left ear position. For the left ear position: the system identifies which triangle contains the desired direction at 711; an impulse response is obtained with a weighted version of all vertices HRIRs at 713 (the weights are also used to apply a time offset to the obtained HRIR; and the HRIR is downsampled, to the original sample rate at 715. Note, for a point on the HRTF sphere that falls exactly on an edge or vertex of multiple triangle sections, only one triangle section needs to be considered. Then, the weight of each vertex is calculated.

At 717, the system gets the position of the sound source in relation to the right ear position. For the right ear position: the system identifies which triangle contains the desired direction at 719; an impulse response is obtained with a weighted version of all vertices HRIRs at 721 (the weights are also used to apply a time offset to the obtained HRIR; and the HRIR is downsampled, to the original sample rate at 723. Note, for a point on the HRTF sphere that falls exactly on an edge or vertex of multiple triangle sections, only one triangle section needs to be considered. Then, the weight of each vertex is calculated.

While the present system has been described with reference to certain implementations, it will be understood by those skilled in the art that various changes may be made and equivalents may be substituted without departing from the scope of the present system. In addition, many modifications may be made to adapt a particular situation or material to the teachings of the present disclosure without departing from its scope. Therefore, it is intended that the present method and/or system not be limited to the particular implementations disclosed, but that the present system will include all implementations falling within the scope of the appended claims.

As utilized herein the terms "circuits" and "circuitry" refer to physical electronic components (i.e. hardware) and any software and/or firmware ("code") which may configure the hardware, be executed by the hardware, and or otherwise be associated with the hardware. As used herein, for example, a particular processor and memory may comprise first "circuitry" when executing a first one or more lines of code and may comprise second "circuitry" when executing a second one or more lines of code. As utilized herein, "and/or" means any one or more of the items in the list joined by "and/or". As an example, "x and/or y" means any element of the three-element set {(x), (y), (x, y)}. In other words, "x and/or y" means "one or both of x and y". As another example, "x, y, and/or z" means any element of the seven-element set {(x), (y), (z), (x, y), (x, z), (y, z), (x, y, z)}. In other words, "x, y and/or z" means "one or more of x, y and z". As utilized herein, the term "exemplary" means serving as a non-limiting example, instance, or illustration. As utilized herein, the terms "e.g.," and "for example" set off lists of one or more non-limiting examples, instances, or illustrations. As utilized herein, circuitry is "operable" to perform a function whenever the circuitry comprises the necessary hardware and code (if any is necessary) to perform the function, regardless of whether performance of the function is disabled or not enabled (e.g., by a user-configurable setting, factory trim, etc.).

What is claimed is:

1. A method, the method comprising:

determining a first point of intersection for a 3D sound source relative to a left ear, wherein audio from the 3D sound source is operable for presentation via headphones, wherein the first point of intersection for the 3D sound source relative to the left ear is a first position on a sphere mesh as centered on the left ear;

generating a first impulse response according to a first set of existing impulse responses, wherein the first set of existing impulse responses comprises three existing impulse responses, and wherein the first impulse response is generated by aligning in the time domain and interpolating a plurality of existing impulse responses of the first set of existing impulse responses;

time aligning the first impulse response according to a weighted combination of delays associated with each impulse response of the first set of existing impulse responses;

determining a second point of intersection for the 3D sound source relative to a right ear, wherein the second point of intersection for the 3D sound source relative to the right ear is a second position on the sphere mesh as centered on the right ear;

generating a second impulse response according to a second set of existing impulse responses; and time aligning the second impulse response according to a weighted combination of delays associated with each impulse response of the second set of existing impulse responses.

2. The method of claim 1, wherein the second set of existing impulse responses comprises three prerecorded impulse responses, and wherein the second impulse response is generated by time aligning and interpolating a plurality of existing impulse responses of the second set of existing impulse responses.

3. The method of claim 1, wherein the method comprises in a dataset of impulse responses, and wherein each impulse response in the dataset of impulse responses is associated with a unique location of a sound source, and wherein each unique location of the sound source is equidistant from a location of the recording.

4. The method of claim 1, wherein the first set of prerecorded impulse responses and the second set of prerecorded impulse responses are selected from a dataset, and wherein each impulse response in the dataset corresponds to an azimuth and an elevation, and wherein each azimuth and elevation corresponds to a vertex of the sphere mesh.

5. The method of claim 1, wherein the first position on the sphere mesh is based on a first vector that begins at the left ear and passes through a desired sound source location, and wherein the second position on the sphere mesh is based on a second vector that begins at the right ear and passes through the desired sound source.

6. The method of claim 1, wherein every position on the sphere mesh is within a triangle section of the sphere mesh, and wherein the three prerecorded impulse responses correspond to three vertices of the triangle section.

7. The method of claim 1, wherein the interpolation comprises generating a magnitude-interpolated impulse response by combining a plurality of weighted magnitudes of time aligned impulse responses.

8. The method of claim 1, wherein the method comprises mixing a mono component with the first impulse response and the second impulse response, if a desired sound source is located within a listener's head.

9. A non-transitory computer-readable medium having a plurality of code sections, each code section comprising a plurality of instructions executable by one or more processors to perform actions, wherein the actions of the one or more processors comprise:

determining a first point of intersection for a 3D sound source relative to a left ear, wherein audio from the 3D sound source is operable for presentation via headphones, wherein the first point of intersection for the 3D sound source relative to the left ear is a first position on a sphere mesh as centered on the left ear;

generating a first impulse response according to a first set of prerecorded impulse responses, wherein the first set of prerecorded impulse responses comprises three prerecorded impulse responses, and wherein the first impulse response is generated by time aligning and interpolating a plurality of prerecorded impulse responses of the first set of prerecorded impulse responses;

time aligning the first impulse response according to a weighted combination of delays associated with each impulse response of the first set of existing impulse responses;

determining a second point of intersection for the 3D sound source relative to a right ear, wherein the second point of intersection for the 3D sound source relative to the right ear is a second position on the sphere mesh as centered on the right ear;

generating a second impulse response according to a second set of prerecorded impulse responses; and time aligning the second impulse response according to a weighted combination of delays associated with each impulse response of the second set of existing impulse responses.

10. The non-transitory computer-readable medium of claim 9, wherein the second set of prerecorded impulse responses comprises three prerecorded impulse responses, and wherein the second impulse response is generated by time aligning and interpolating a plurality of prerecorded impulse responses of the second set of prerecorded impulse responses.

11. The non-transitory computer-readable medium of claim 9, wherein the actions comprise controlling a device to record a dataset of impulse responses, and wherein each impulse response in the dataset of impulse responses is associated with a unique location of a sound source, and wherein each unique location of the sound source is equidistant from a location of the recording.

12. The non-transitory computer-readable medium of claim 9, wherein the first set of prerecorded impulse responses and the second set of prerecorded impulse responses are selected from a dataset, and wherein each impulse response in the dataset corresponds to an azimuth and an elevation, and wherein each azimuth and elevation corresponds to a vertex of the sphere mesh.

13. The non-transitory computer-readable medium of claim 9, wherein the first position on the sphere mesh is based on a first vector that begins at the left ear and passes through a desired sound source location, and wherein the second position on the sphere mesh is based on a second vector that begins at the right ear and passes through the desired sound source.

14. The non-transitory computer-readable medium of claim 9, wherein every position on the sphere mesh is within a triangle section of the sphere mesh, and wherein the three prerecorded impulse responses correspond to three vertices of the triangle section.

15. The non-transitory computer-readable medium of claim 9, wherein the interpolation comprises generating a magnitude-interpolated impulse response by combining a plurality of weighted magnitudes of time aligned impulse responses.

16. The non-transitory computer-readable medium of claim 9, wherein the actions comprises mixing a mono component with the first impulse response and the second impulse response, if a desired sound source is located within a listener's head.

* * * * *